(12) United States Patent
Sunakawa et al.

(10) Patent No.: US 6,249,609 B1
(45) Date of Patent: *Jun. 19, 2001

(54) APPARATUS AND METHOD FOR PROCESSING IMAGES

(75) Inventors: Shinichi Sunakawa, Asaka; Kazuhiro Matsubayashi, Yokohama, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/717,071

(22) Filed: Sep. 20, 1996

(30) Foreign Application Priority Data

Sep. 22, 1995 (JP) .................................... 7-268058

(51) Int. Cl.[7] ...................................... G06K 9/36
(52) U.S. Cl. ...................... 382/232; 382/250; 382/276
(58) Field of Search ........................... 382/276, 250, 382/199, 235, 232, 238, 239, 282; 358/532, 433, 467, 527, 78, 462

(56) References Cited

U.S. PATENT DOCUMENTS

| 5,014,198 | * | 5/1991 | Umemura | 364/413 |
| 5,046,121 | * | 9/1991 | Yonekawa et al. | 382/56 |
| 5,086,487 | * | 2/1992 | Katayama et al. | 382/56 |
| 5,187,755 | * | 2/1993 | Aragaki | 382/56 |
| 5,333,212 | * | 7/1994 | Ligtenberg | 382/56 |
| 5,517,327 | * | 5/1996 | Nakatani et al. | 358/462 |
| 5,539,842 | * | 7/1996 | Schwartz | 382/232 |
| 5,657,399 | * | 8/1997 | Iwabuchi et al. | 382/248 |

FOREIGN PATENT DOCUMENTS 2-202771   8/1990   (JP) .

* cited by examiner

Primary Examiner—Leo Boudreau
Assistant Examiner—Kanji Patel
(74) Attorney, Agent, or Firm—Fitzpatrick, Cella, Harper & Scinto

(57) ABSTRACT

An image processing apparatus makes it possible to cut off a desired image with a high extraction rate irrespective of whether or not an inputted image has compression hysteresis. With the image processing method therefor, the inputted image data are at first divided into small blocks, and then, frequency transformation is executed. Further, small blocks are detected with respect to those containing character areas. Subsequently, detection is made as to whether or not any non-reversible compression is processed to the frequency transformed image data. In accordance with the result of such detection, data on a table are retrieved to obtain determination threshold values. On the basis of the determination threshold values thus retrieved, the small blocks containing characters are detected for separation.

25 Claims, 11 Drawing Sheets

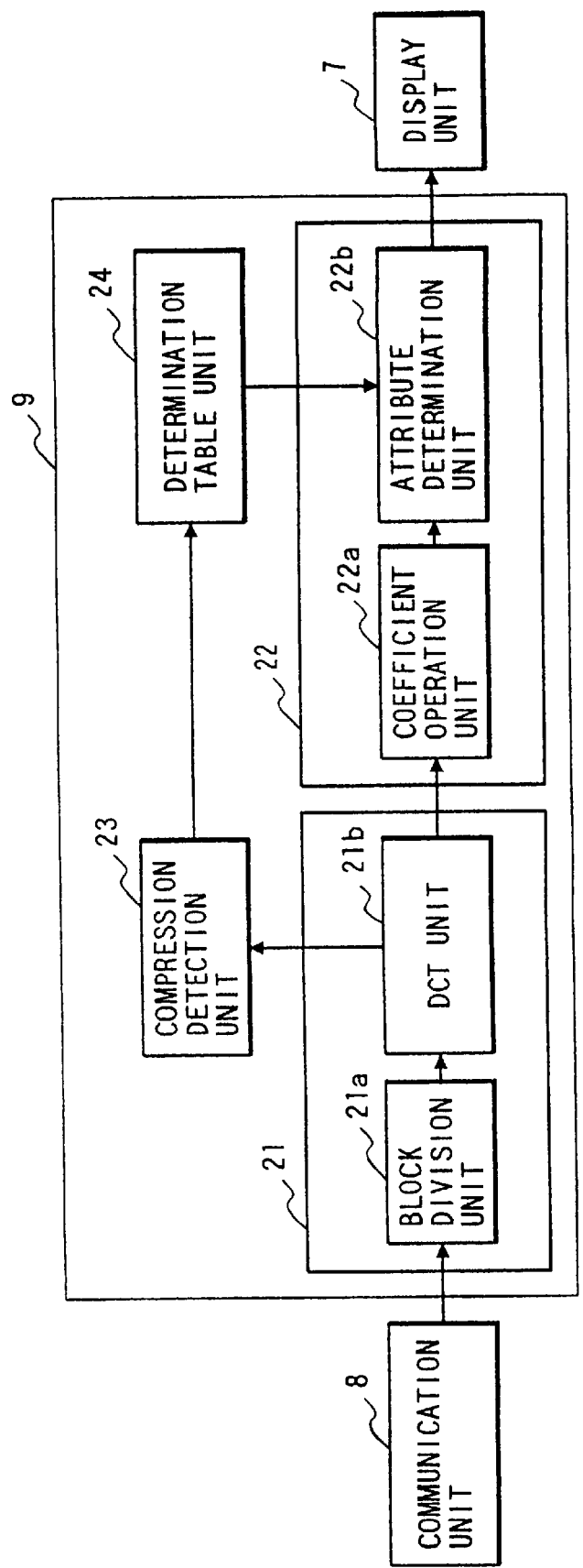

FIG. 6

| COEFFICIENT VALUE / FREQUENCY | 1<br>0-63 | 2<br>64-127 | 3<br>128-191 | 4<br>192-255 |
|---|---|---|---|---|
| 1 | 40 | 30 | 40 | 30 |
| 2 | 30 | 40 | 30 | 40 |
| 3 | 50 | 30 | 20 | 10 |
| 4 | 70 | 30 | 10 | 0 |
| 5 | 80 | 20 | 0 | 0 |
| 6 | 100 | 0 | 0 | 0 |
| 7 | 100 | 0 | 0 | 0 |

| TYPE | CONDITION | FREQUENCY RATIO | AMPLITUDE RATIO | DETERMINATION THRESHOLD VALUE |
|---|---|---|---|---|
| A | NO COMPRESSION | 0.4 | 0.3 | 450 |
| B | COMPRESSION 1 | 0.3 | 0.2 | 350 |
| C | COMPRESSION 2 | 0.2 | 0.1 | 250 |
| D | COMPRESSION 3 | 0.1 | 0.0 | 200 |

| 60 HEADER | GENERAL INFORMATION | IMAGE TITLE<br>IMAGE SIZE<br>NUMBER OF BITS<br>⋮ | 62 |
| --- | --- | --- | --- |
| | COMPRESSION HYSTERESIS | #1 SYSTEM NAME: JPEG<br>    QUANTIZATION TABLE<br>      $D(0,0)=1$<br>      $D(0,1)=1$<br>      ⋮<br>      $D(7,7)=20$ | 63 |
| | | #2 SYSTEM NAME: MPEG<br>    QUANTIZATION TABLE<br>      $D(0,0)=2$<br>      $D(0,1)=3$<br>      ⋮<br>      $D(7,7)=50$ | 64 |
| | | #3 | 65 |
| 61 FRAME | | | |

| IMAGE TYPE | BINARY IMAGE L | HALFTONE IMAGE L | THRESHOLD VALUE | SAMPLING RATE [%] | |
|---|---|---|---|---|---|
| NO COMPRESSION | 600 | 300 | 450 | 90 | ~114 |
| COMPRESSION HYSTERESIS PRESENT | 300 | 200 | 250 | 90 | ~115 |
| | | | 450 | 20 | ~116 |

APPARATUS AND METHOD FOR PROCESSING IMAGES

BACKGROUND OF THE INVENTION

1. Field of the Invention

The present invention relates to an image processing apparatus for separating and extracting a photographic area or a half-tone image area, and a character area from image data to be inputted, and relates to the image processing method therefor.

2. Related Background Art

For a copying machine, OCR equipment, and the like, a method has hitherto been proposed for separating a photographic area or a half-tone image area, and a character area by transforming an image into data on the spatial frequency axis. The outline of such conventional method will be described hereunder.

(1) In the preprint 93-01-02 of a study group of Gazou Denshi Gakkai (or the Video Electronics Institute), a method for separating image area is disclosed with a particular attention given to the difference in frequency characteristics of a character image and a half-tone image. In accordance with this method, an image data is at first divided into small-sized blocks of 8×8, and then, the discrete cosine transformation (DCT) is performed. The DCT is widely adopted for a method for encoding of JPEG (Joint Photographic Exert Group) standard, and is used for the transformation of image data into data on frequency axis. As a result of this transformation, the coefficient of each of the blocks is made to represent the direct current component of the block by one line and one column, the horizontally directed frequency in the column direction, and the vertically directed frequency in the line direction. In each of the directions, it is indicated that the more the line (column) number increases, the higher is the intensity of frequency. Then, subsequent to the DCT performance, a zigzag scanning process is executed to transform the two-dimensional block data into one-dimensional one. This is also a method adopted for the JPEG standard. As shown in FIG. 11, scanning is performed diagonally from a lower frequency range to a higher frequency range. In the step that follows, the "zigzag rate" is worked out in accordance with the following formula:

ZigZag_Rate[i]ZigZag[i]×2−ZigZag[i−1]−ZigZag[i+1] (i:1 to 63)

In continuation, the zigzag rates at the lower frequency range and higher frequency range are estimated, and defined as ZZ_Rate_moji and ZZ_Rate_HT, respectively. Then, if the discriminative condition of the formula (1) given below is satisfied, the data are determined to represent a character image. If that of the formula (2) given below is satisfied, the data are determined to represent a half-tone image. This process utilizes the characteristics of the zigzag rate: a character image has a larger value at the lower frequency range, while a half-tone image has a larger value at higher frequency range.

ZZ_Rate_moji+key≧k1     (1)

ZZ_Rate_HT+key≧k2     (2)

Here, for the constants k1 and k2, those experimentally defined are used. A value, which is obtainable by working out the results of determinations on the circumferential four blocks in accordance with the following formula, is used for the key; flags in the following formula are the functions that take a negative value if the determination result indicates a character image, and a positive value if it indicates a half-tone image:

key=0.25(flag(top)+flag(left))+0.125 (flag(second from the left)+ Flag(top aslant))

(2) In an article titled "a DCT encoding method using adaptive quantization" of the magazine No. 5, Vol. 20 of the Gazou Denshi Gakkai (or the Video Electronics Institute), there is disclosed a method for implementing the prevention of character image deterioration in order to enhance the compression rate of the half-tone image area by separating the character image and the half-tone image and then, by switching over the quantization tables of image compressions. In this method, image data is at first divided into blocks each in size of 8×8. Then, DCT is performed. Subsequently, the sum of absolute values of coefficients contained in the areas 100 to 104 shown in FIGS. 12A to 12E is calculated. Then, if the maximum value of the sum of the coefficients contained in areas 101 to 104 is greater than the area 100, and the maximum value of the sum of the coefficients contained in areas 101 to 104 is greater than a given threshold value A, this block is determined to represent a half-tone image. Also, in FIG. 12F, the sum of the absolute values of coefficients contained in the area 105 is greater than a threshold value B. Therefore, it is not determined that this block represents any half-tone image. This block represents a character image.

(3) In a "facsimile apparatus" specified in Japanese Patent Laid-Open Application No. 2-202771, there is disclosed a method for implementing the distinctive separation between a binary image area and a half-tone image area. In this apparatus, the image area determination parameter unit functions to divide an image data into small blocks each in size of 4×4, and execute a two-dimensional Hadamard transformation. Now, given Yij as coefficient factor of Hadamard transformation, the image separation parameter L is worked out by the following formula:

L=ΣΣYij² (i+j=3, 4, 5, 6)

Then, in accordance with the value of L, the slice level of binary coding is determined. This is due to the fact that "the transformation result hypothetically defined for a binary image area has a greater energy with respect to the higher spatial frequency", that is, it is indicated that the value L is greater in the binary image area, while the value L is smaller in the half-tone image area.

However, there is such a drawback in the conventional methods described above that the character extraction rate is lowered when an image for which non-reversible compression is processed is mixed with the one for which it is not processed in a representation. In other words, the non-reversible compression process is to quantize the high frequency component of an image and discarded it to make compression. As a result, the frequency distribution of the expanded image becomes different from that of the original one.

However, in accordance with the conventional methods, these images are determined by means of threshold values that are uniformly set. Therefore, erroneous sampling is often caused. Particularly, when the same values is taken by the image separation parameter L of the binary image area of an image having compression hysteresis and the image separation parameter L of the half-tone image area of the original image take the same value, it is made impossible to set any appropriate threshold values in this respect.

In the meantime, for an apparatus structured to demand its user to take this set up procedure, the user should establish each time whether or not a target image has any compression hysteresis. There is then a drawback that the operativity thereof becomes extremely unfavorable.

FIG. 13 is a view which shows one example of the threshold value set up for each of the images. In FIG. 13, the column 110 indicates the averaged value of the image area separation parameters Ls of binary image areas of each images. The column 111 indicates the averaged value of Ls of the half-tone areas. The column 112 indicates each of the threshold values to make separation. The column 113 indicates each of the sampling rates. Also, the sampling result 114 represents an example in which an original image having no compression hysteresis is processed. Sampling results 115 and 116 represent examples in which images having compression hysteresis are processed, respectively. In the sampling result 114, the determination threshold values are set at the averaged value of the Ls of the binary image area and half-tone image area for the exemplified original image. Thus, a sampling rate of 90% is obtained. In the sampling result 115, the determination threshold values are set likewise to obtain a sampling rate of 90% for the image having compression hysteresis. Here, in a case where an image having compression hysteresis and an original image are mixed in a representation, these are all determined by the application of the threshold values of the original image. If such determination is made, almost all the binary image areas should be determined as half-tone image areas as indicated by the sampling result 116. As a result, the sampling rate becomes extremely unfavorable.

SUMMARY OF THE INVENTION

The present invention is designed in consideration of the problems described above. It is an object of the invention to provide an image processing apparatus capable of cutting off a desired image with a high extraction rate irrespective of whether an inputted image has any compression hysteresis or not, and to provide the image processing method therefor.

In order to achieve this object, an image processing apparatus of the present invention comprises means for creating image characteristics by executing the transformation of a given data for an inputted image in order to create the image characteristics corresponding to the attribute of such image; means for detecting image to detect the image area of a desired attribute by carrying out a comparative operation with respect to the image characteristics thus created; means for determining compression process to determine whether or not the inputted image data is processed for its non-reversible compression; and means for controlling comparative operation to control the aforesaid comparative operation in accordance with the result of the aforesaid process determination.

In order to achieve the object described above, an image processing method of the present invention comprises the steps of creating image characteristics by executing the transformation of a given data for an inputted image in order to create the image characteristics corresponding to the attribute of such image; of detecting the image area of a desired attribute by carrying out a comparative operation with respect to the image characteristics thus created; of determining whether or not any non-reversible compression is processed for the inputted image data; and of controlling the aforesaid comparative operation in accordance with the result obtainable in the step of determining the presence of such non-reversible compression.

BRIEF DESCRIPTION OF THE DRAWINGS

FIG. 2 is a block diagram showing schematically the structure of the image area detection unit represented in FIG. 1.

FIG. 6 is a view showing one example of the amplitude histogram of the frequency image produced by the CPU represented in FIG. 1.

FIG. 7 is a view showing one example of data structure stored in the determination table represented in FIG. 2.

FIG. 10 is a view which shows one example of the file structure of an inputted image.

DETAILED DESCRIPTION OF THE PREFERRED EMBODIMENTS

Hereinafter, with reference to the accompanying drawings, the detailed description will be made of the embodiments in accordance with the present invention.

Figure 1:
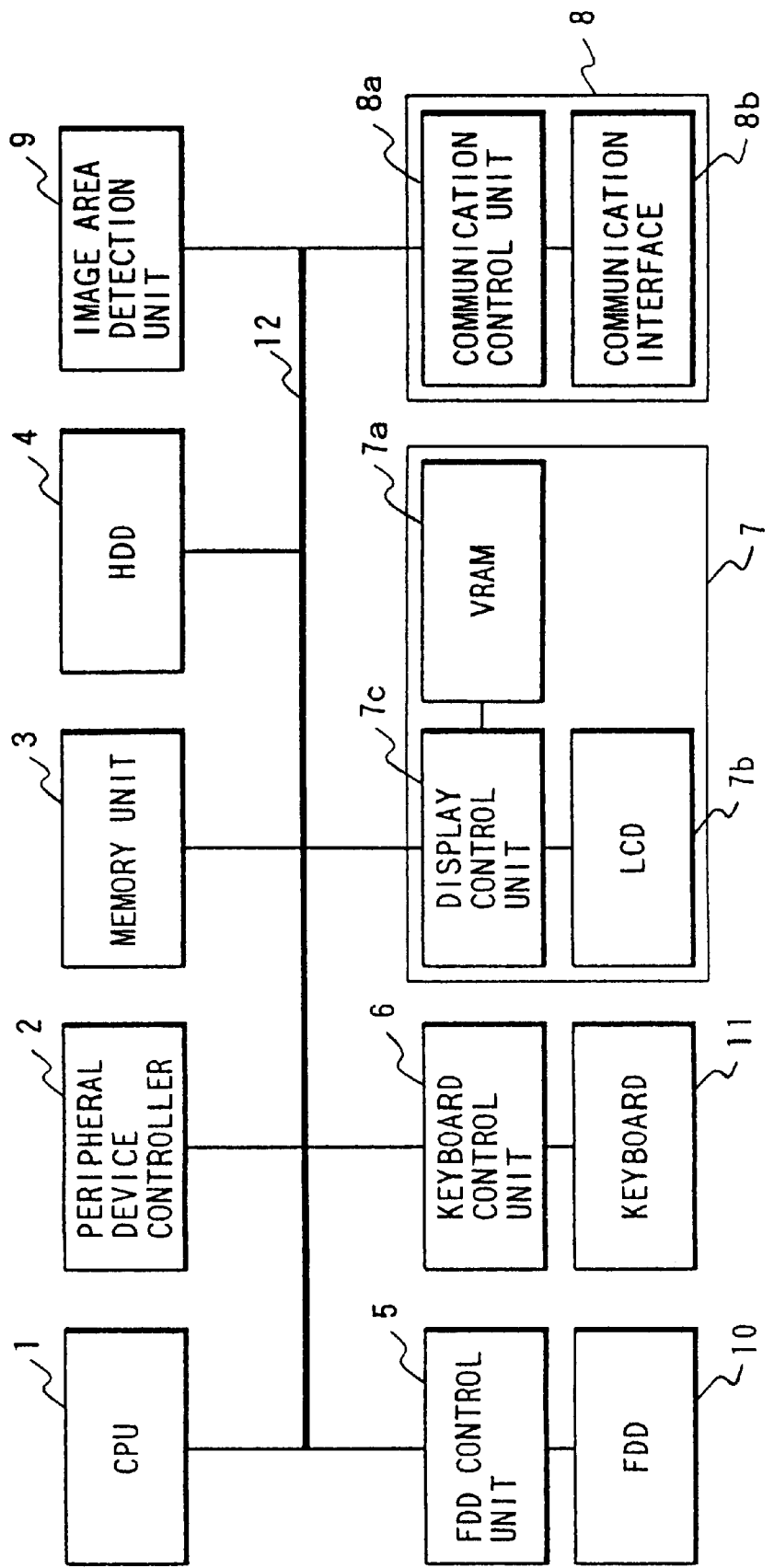
FIG. 1 is a block diagram which schematically shows the structure of an image processing apparatus in accordance with a first embodiment of the present invention.

(a) First Embodiment:

FIG. 1 is a block diagram schematically showing the structure of an image processing apparatus in accordance with a first embodiment of the present invention. The image processing apparatus of the first embodiment is structured to receive images from a communication unit 8, to store them in a memory unit 3, to process stored images by means of a CPU 1, and to output images thus processed on a display unit 7. In accordance with the first embodiment, the image processing apparatus is provided with a function to cut off character area from the inputted image for storage, and to execute an image retrieval by means of the character area thus stored.

In FIG. 1, a reference numeral 1 designates a CPU that controls the apparatus as a whole and executes operations, I/O controls, and others in accordance with a program stored in a memory unit 3. The CPU 1 and the constituents 2 to 9 given below are connected with each other through a bus 12.

A controller 2 for the peripheral devices is used together with the CPU 1 as a set to execute the I/O controls (serial communication, parallel communication, real-time clocking, timer, interruption control, DMA control, and others) required for controlling peripheral devices (not shown).

The memory unit 3 is provided for the CPU 1 as a main memory including DRAM, cache RAM, ROM and other memories. Also, the memory unit 3 dually functions as work area for image area detection process.

The HDD 4 is a hard disk drive to define user data, to set up devices, and to store image data.

The FDD control unit 5 is to control a floppy disk drive (FDD) 10.

The key board control unit 6 is to transmit scanning signals to the key board 11, and to process the generation of key codes in accordance with the result of scanning.

The display unit 7 is a unit to represent various pieces of information, comprising a VRAM 7a to store indication data per screen to be displayed on a liquid crystal panel 7b; the liquid crystal panel 7b to display image data together with information on various files; and a display control unit 7c to read indication data from the VRAM 7a one after another and transfer them to the liquid crystal panel 7b, while executing the gradational transformation or the like. Also, the display control unit 7c functions to adjust access from the CPU 1 to the VRAM 7a, and the data transfer from the VRAM 7a to the liquid crystal panel 7b as well.

The communication unit 8 is a unit to exchange various data with peripheral devices (not shown), comprising a communication control unit 8a and communication interface 8b. The communication standard is an interface of a serial communication such as RS-232C, Ethernet, and a parallel communication such as centronics, and SCSI, which performs the input and output of various data on text or the like, and image data. Also, an interface of NTSC type is provided for the input and output of television signals.

The image area detection unit 9 is to extract the character area from an image data.

FIG. 2 is a block diagram schematically showing the structure of the image area detection unit 9.

In FIG. 2, the image area detection unit 9 comprises a frequency image transformation unit 21 to execute frequency transformation by dividing an inputted image into small blocks; an area extraction unit 22 to detect small blocks that contain characters from among the small blocks divided by the frequency image transformation unit 21; a compression detecting unit 23 to detect whether or not any non-reversible compression process is applied to an inputted image; a determination table unit 24 to output threshold values for use of determination in the area extraction unit 22 in accordance with outputs from the compression detecting unit 23.

The frequency image transformation unit 21 comprises a block division unit 21a to divide an image data into small blocks of 8×8 each, and a DCT unit 21b to perform discrete cosine transformation (DCT) with respect to these small blocks to transform them into coefficient data on the spatial frequency axis. In this respect, the block division unit 21a and the DCT unit 21b use the same techniques as those adopted for the standard regulations of the JPEG method, MPEG (Motion Picture Experts Group) method, or the like. Therefore, the detailed description of the principle thereof will be omitted.

The area extraction unit 22 comprises a coefficient operation unit 22a to work out from the frequency coefficients of the small blocks the coefficients that are applicable to separating the character area and the image area; and an attribute determination unit 22b to determine whether or not the blocks contain any character area by comparing the results of the coefficient operation unit 22a with the threshold values. In accordance with the first embodiment, the coefficient operation unit 22a works out the image separation parameter L referred to in the paragraph (3) of the description of the prior art. In this respect, however, the method of coefficient operation is not limited thereto. It may be possible to adopt any other method if only such method can work out the coefficient that is applicable to separating the character area and the image area. Also, the determination threshold values that the attribute determination unit 22b uses are made available from the determination table unit 24 in accordance with the detection result of the compression detecting unit 23 as to whether or not an inputted image has been given any non-reversible compression process before. The attribute determination unit 22b uses the determination results of the surrounding blocks as conditions required for making its determination in accordance with the determination threshold values thus made available as in the prior art.

Now, hereunder, with reference to FIGS. 3A to FIG. 7, the description will be made of the control processes to be executed by an image processing apparatus structured as described above.

Figure 3B:
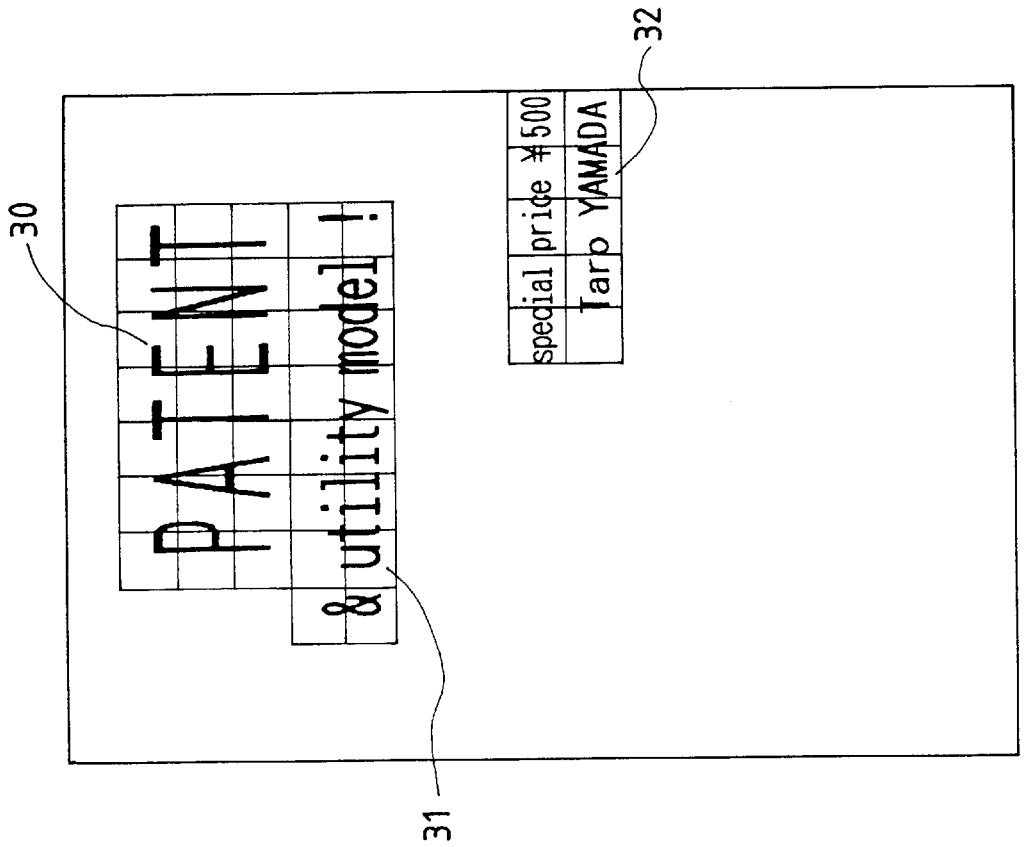
FIGS. 3A and 3B are views illustrating the outline of the character cut off process to be executed by the image area detection unit represented in FIG. 1.
Figure 3A:
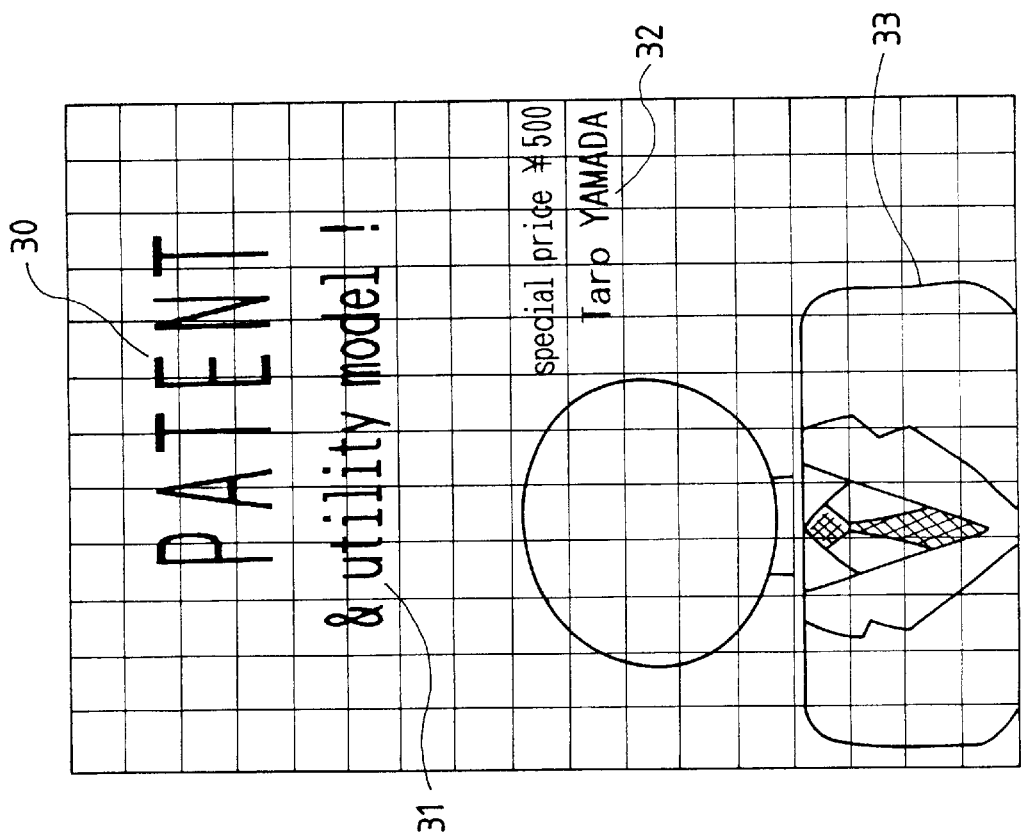

FIGS. 3A and 3B are views illustrating the outline of character cut off processes to be executed by an image processing apparatus of the first embodiment using its image area detection unit 9 in particular. In accordance with the first embodiment of the present invention, the image area detection unit 9 executes a process to extract the character area when a document image is inputted, in which a photograph is mixed for representation, for example.

FIG. 3A shows one example of an inputted document image, which is formed by four elements, that is, characters at 30, 31, and 32, and a photograph at 33. In FIG. 3A, the meshes represent the boundaries of small blocks to be described later. The original document image is not shown. FIG. 3B is a view which shows the result of character extraction. Only the character areas at 30, 31, and 32 are cut off for representation. In other words, the process to be executed by the image area extraction unit 9 is to form an image as shown in FIG. 3B from the inputted image as shown in FIG. 3A.

Figure 4:
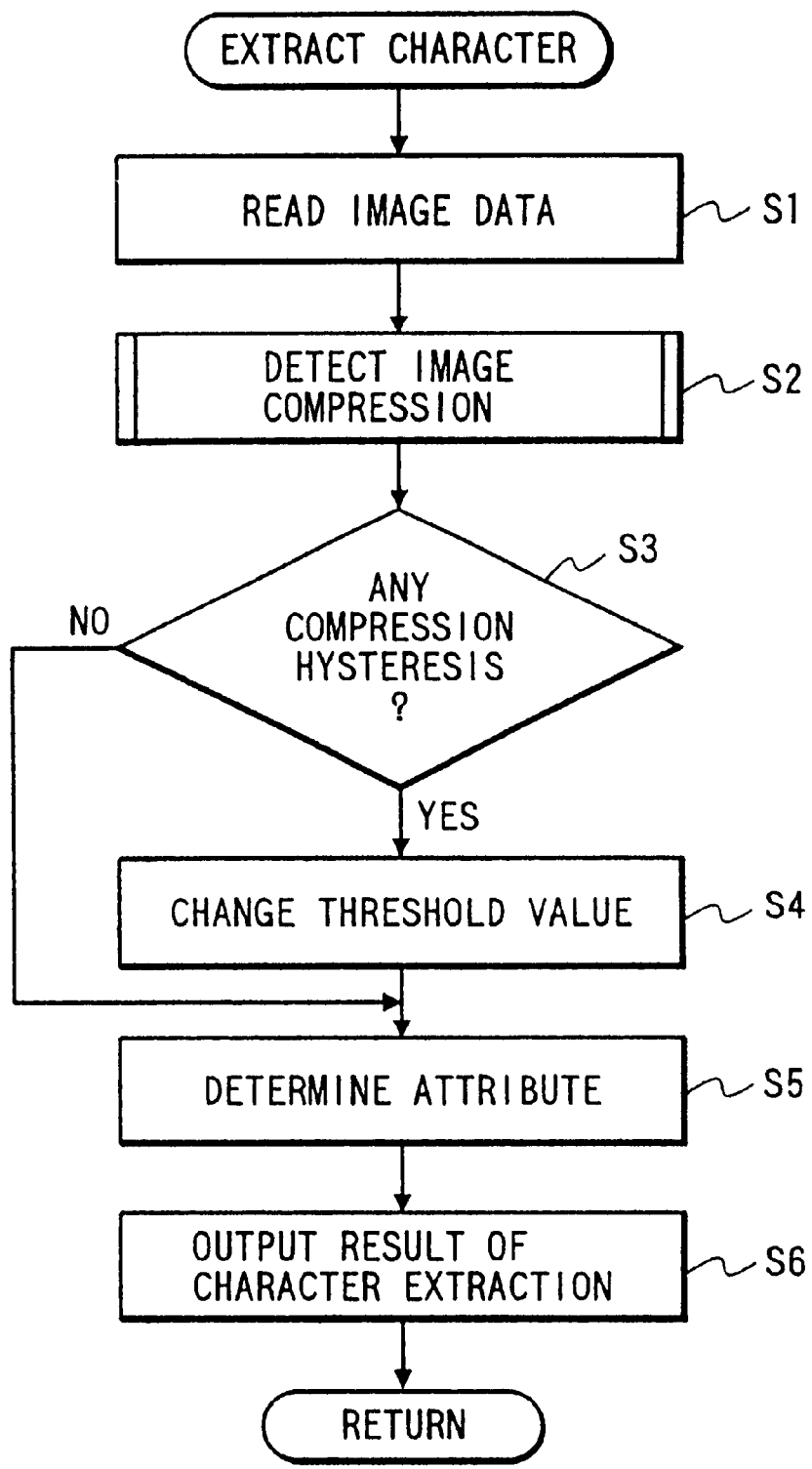
FIG. 4 is a flowchart showing the procedure of character area extraction process to be executed by the CPU represented in FIG. 1.

FIG. 4 is a flowchart which shows the procedure of character area extraction processes to be executed by the CPU 1 using the image area detection unit 9. The outline of such processes is: the frequency of an inputted image is transformed at first to detect whether or not any non-reversible compression process has been given to such image, and then, to set up the threshold values for the attribute determination in accordance with the result of the compression detection process, thus executing the attribute determination process per small block of the image whose frequency has been transformed (hereinafter, referred to as a "frequency image").

In FIG. 4, image data are at first read in step S1 from the memory unit 3 and the HDD.

Then, in step S2, the compression hysteresis of the image is detected in accordance with the compression detecting process sub-routine, which will be described later. In step S3, whether or not the image has been compressed is determined. If it is determined that the image has been compressed, the process proceeds to step S4. If not, the process proceeds to step S5 skipping over the step S4.

In the step S4, data on the table of the determination table unit 24 are retrieved in accordance with the result of the compression detection. The threshold value thus retrieved is set up in the attribute determination unit 22b.

In the step S5, an attribute determination process is executed to compare the image area separation parameter L with the threshold value set up in the attribute determination unit 22b. Thus, each of the small blocks is determined as to whether it is a character area or a photographic area. In accordance the result thereof, the image is divided for separation.

In the following step S6, the image whose character area is extracted is output to the HDD 4 or the like to complete the current process of the character area extraction.

Figure 5:
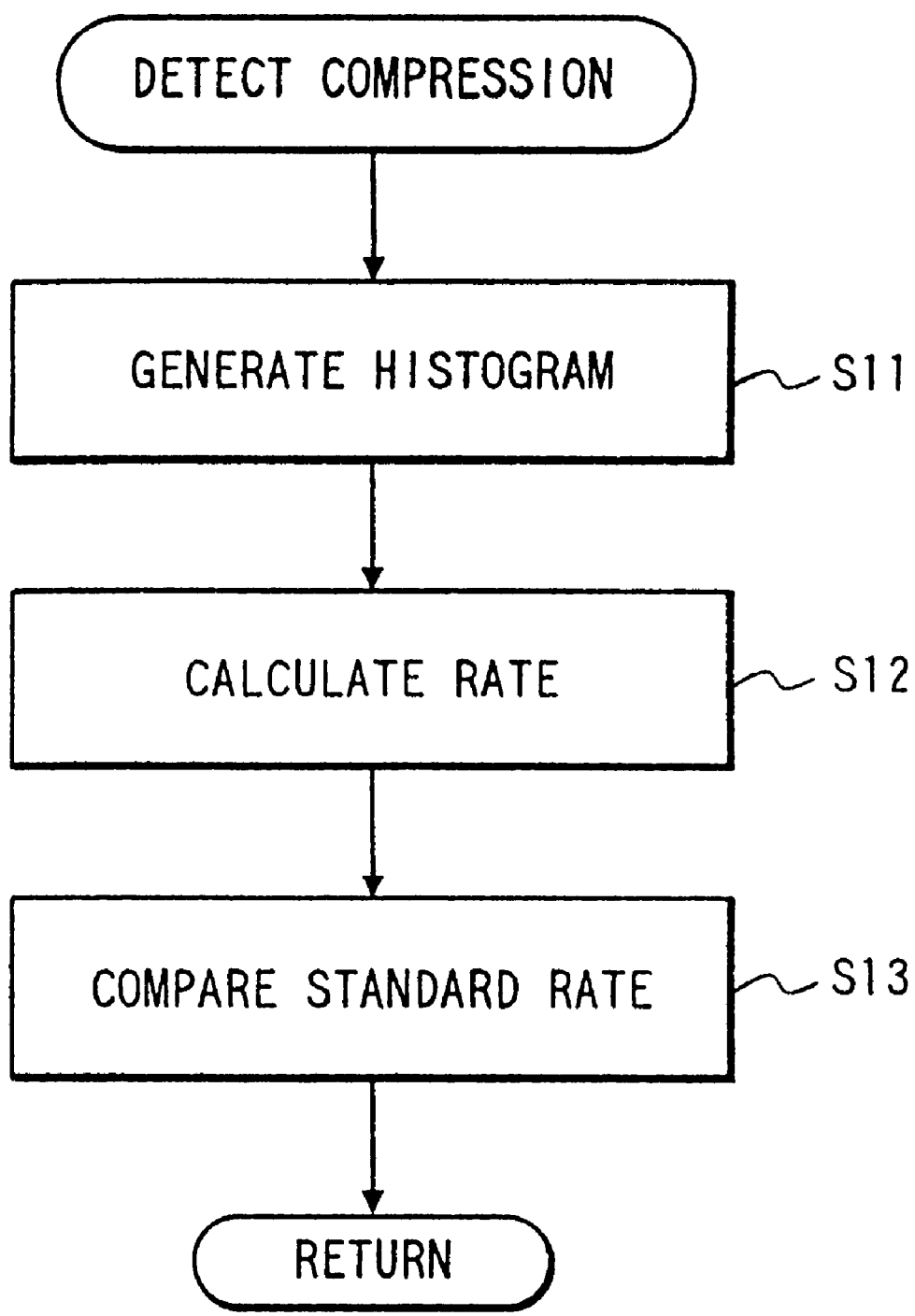
FIG. 5 is a flowchart showing the detailed sub-routine of the compression detecting process in the step S2 described in FIG. 4.

FIG. 5 is a flowchart which shows the detailed procedure of the compression detecting process sub-routine in the step S2 described above. This compression detecting process is to prepare the amplitude histogram of an frequency image, and then, to compare the frequency distribution with threshold values. Hence, the presence or absence of compression hysteresis is determined.

In FIG. 5, the amplitude histogram of the frequency image is at first produced in step S11. The amplitude histogram is an estimate of the distribution of amplitude frequencies per spatial frequency.

FIG. 6 is a view which shows one example of the amplitude histogram thus produced. In the present embodiment, an estimate is made by making 100 blocks representatives from an image. The axis of ordinate represents frequencies, and the axis of abscissa represents the four divisions of amplitude values. For example, the column 41 represents a block having "frequencies whose amplitude is 192 to 255 at frequency 1". The structure of this histogram may be arranged arbitrarily. The target blocks of estimate can be all the blocks within a screen or can be any blocks that are extracted arbitrarily. Also, the frequencies that should be classified may be two-dimensionally vertical and horizontal frequencies or may be only unidirectional ones.

Now, reverting to FIG. 5, the distribution rate is worked out in step S12 in accordance with the frequencies shown in the amplitude histogram. In the first embodiment, the distribution rate is obtained by the following formula; here, the frequencies of the frequency f by the amplitude value a are given as x(f, a):

$$\text{Frequency rate} = \frac{\sum_{a=1}^{4} \sum_{f=1}^{7} \times (f, a)}{\sum_{a=1}^{4} \sum_{f=1}^{5} \times (f, a)}$$

$$\text{Amplitude rate} = \frac{\sum_{a=2}^{4} \sum_{f=1}^{7} \times (f, a)}{\sum_{f=1}^{7} \times (f, 1)}$$

In this respect, the frequency rate and amplitude rate of the present embodiment are not necessarily limited to the formula described above, but any formula may be applicable arbitrarily. For example, the estimate range of the denominator and numerator may be defined arbitrarily. Also, in the formula described above, the entire amplitude is estimated in working out the frequency rate, but it may be possible to apply a specific range of amplitude. The same is applicable to working out the amplitude rate.

In the step S13 that follows, the rates thus calculated in the step S12 are compared with the distribution threshold values to determine the state of compression. The distribution threshold values are stored in the determination table 24 in advance.

FIG. 7 is a view which shows one example of the data on the table stored in the determination table unit 24. In FIG. 7, the column 52 represents the distribution threshold values of the frequency rate, and the column 53 represents the distribution threshold values of the amplitude rate. For the first embodiment, the state of compression is determined in accordance with the distribution threshold values of the frequency rate. In FIG. 7, the state is determined as "no compression", if the distribution threshold value of the frequency rate is 0.4 or more. The state is determined as "compression 1" if the distribution value of the frequency rate is 0.3 to 0.4 exclusive. Also, it may be possible to determine each state by combining the distribution value of the frequency rate and that of the amplitude rate. The column 51 represents the states of compression determined by the application of these distribution threshold values. For the first embodiment, the states are classified into four. The type A has "no compression", which indicates that any non-reversible compression process has not been given to this image. Each of the types B to D has "compression", which indicates that non-reversible compression process has been given to each of the images. The difference in the compressions 1 to 3 is the difference in the deterioration degree of high frequency range. For a non-reversible compression, its compression rate is caused to change by controlling the amount of attenuation in the high frequency range. The states are discriminated depending on the degrees of deterioration resulting from this control.

Now, the description will be made of the set up of the determination threshold values for the character area. In FIG. 7, the column 54 represents the determination threshold values corresponding to the four states, respectively. In accordance with the states of compressions determined as described above, each of the determination threshold values is retrieved, and the result thereof (the determination threshold value corresponding to a state of compression) is set up in the attribute determination unit 22b. In this way, the threshold value for use of attribute determination can be set up in accordance with the compression hysteresis of an image.

As described above, in accordance with the first embodiment, whether or not an inputted image has any compression hysteresis is detected, and a structure is arranged to switch over the attribute determination threshold values in response to the result of such detection. Therefore, it becomes possible to execute a determination process suitable for the frequency characteristics of an inputted image, and to enhance the extraction rate of the character areas in it.

In this respect, the present invention is not necessarily limited to the first embodiment described above. The invention is widely applicable. For example, in the first embodiment, the use of the DCT has been described as an orthogonal transformation method, the Fourier transformation or the Hadamard transformation may be applicable. Also, as a method of coefficient operation, the description has been made using a method that works out the "image area separation parameter L" in the first embodiment, but any other method may be adoptable, of course, if only it works out coefficient whereby to enable a character area to be separated from an image area. Further, as a method for detecting compression hysteresis, it may be possible to define a distribution function or the like to operate the detection directly without using any histogram.

(b) Second Embodiment:

Now, the description will be made of an image processing apparatus in accordance with a second embodiment of the present invention.

In the first embodiment, the threshold value determination is executed by producing the amplitude histogram of the frequency image in order to change the attribute determination threshold values. In the second embodiment, however, the attribute determination values are changed by detecting compression hysteresis information in an image header. This is a difference between them. Therefore, an image processing apparatus of the second embodiment can be implemented by replacing the image area detection unit 9 shown in FIG. 2 with an image area detection unit 9' shown in FIG. 8.

Figure 8:
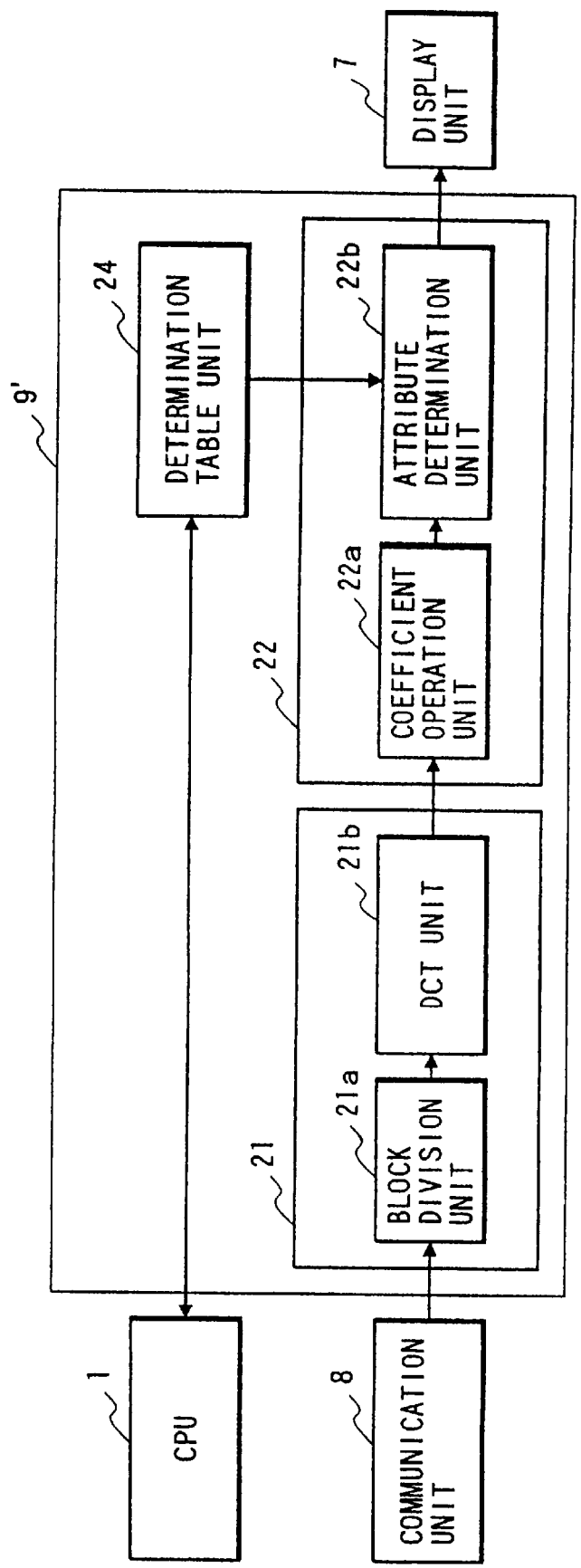
FIG. 8 is a block diagram schematically showing the structure of the image area detection unit of an image processing apparatus in accordance with a second embodiment of the present invention.

In this respect, the same reference marks are applied to the same constituents in FIG. 8 as those appearing in FIG. 2. No particular description will be made of such constituents. As clear from the comparison with FIG. 2, the image area detection unit 9' in FIG. 8 is not provided with any compression detecting unit 23, but compression is detected by means of inner processing of the CPU 1. This is what differs from the first embodiment. As a result, the determination table unit 24 provides determination threshold values in accordance with the results of detection transferred from the CPU 1.

Hereunder, with reference to FIG. 9 and FIG. 10, the description will be made of control processes to be carried out by the image processing apparatus structured as described above.

Figure 9:
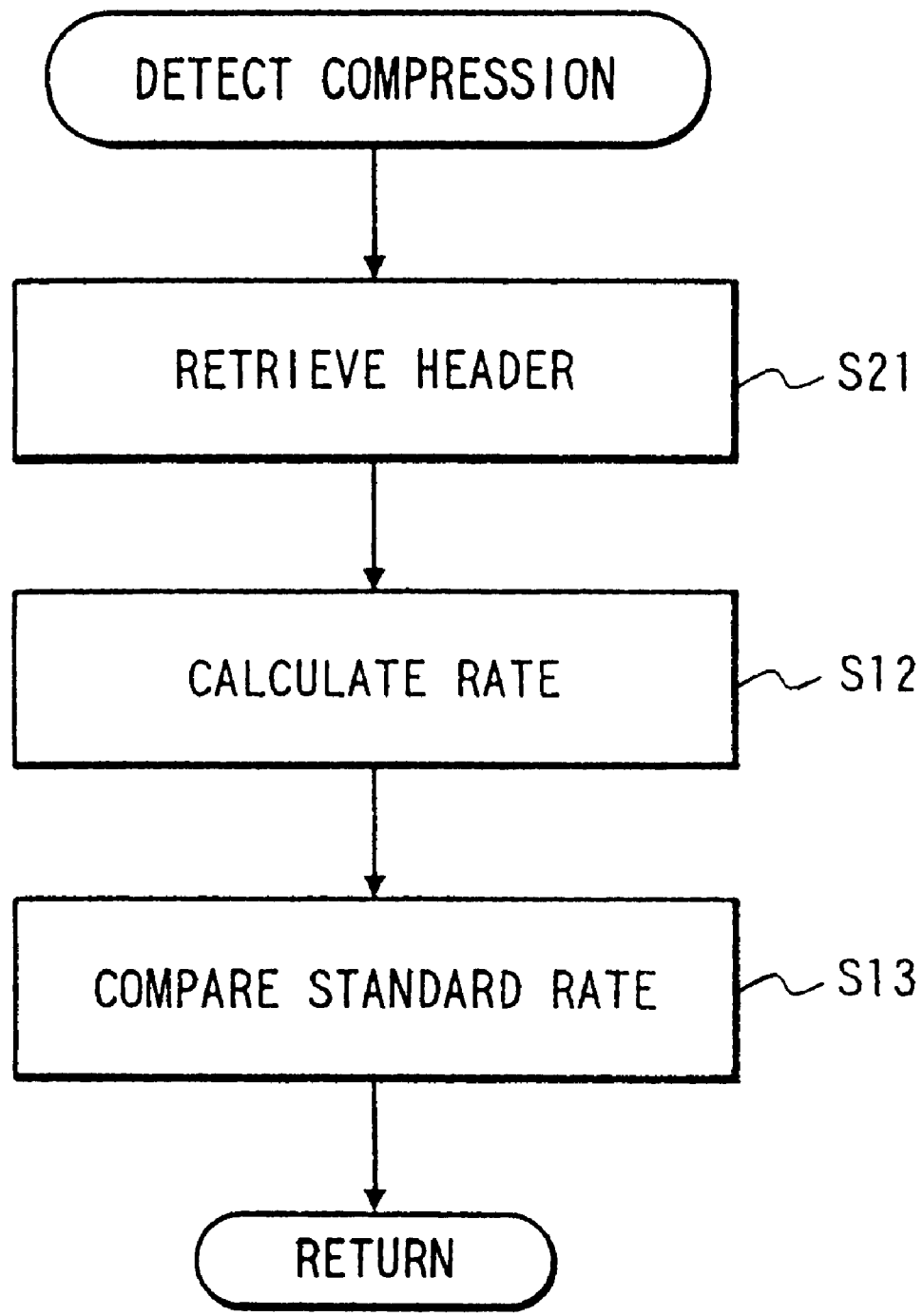
FIG. 9 is a flowchart which shows the detailed sub-routines of the compression detecting process to be executed by the CPU of the image processing apparatus in accordance with the second mode embodying the present invention.
Figures 11, 13:
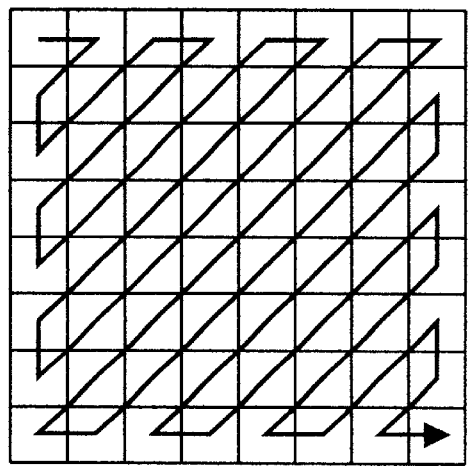
FIG. 11 is a view which illustrates the order in which a zigzag scanning is processed in accordance with the prior art.
FIG. 13 is a view illustrating the relationship between the image area separation parameters and the setting up of threshold values in accordance with the prior art.
Figure 12A:
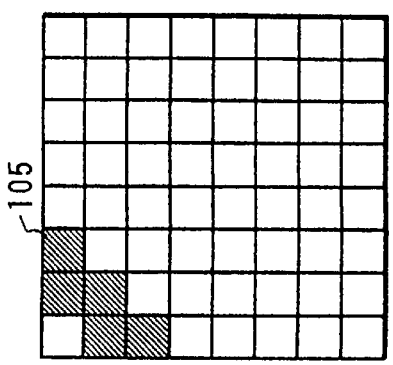
FIGS. 12A to 12F are views illustrating the areas of coefficient estimate operations in accordance with the prior art.
Figure 12B:
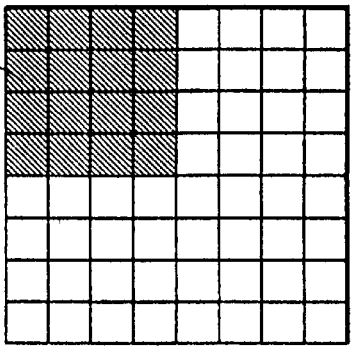
Figure 12C:
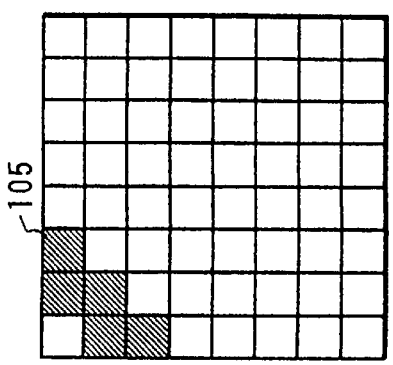
Figure 12D:
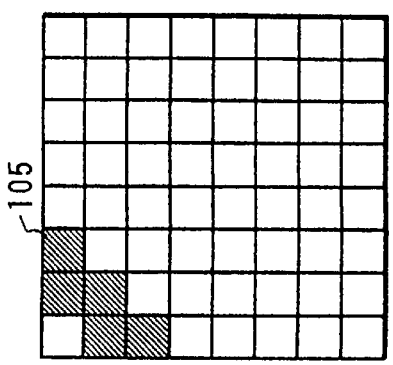
Figure 12E:
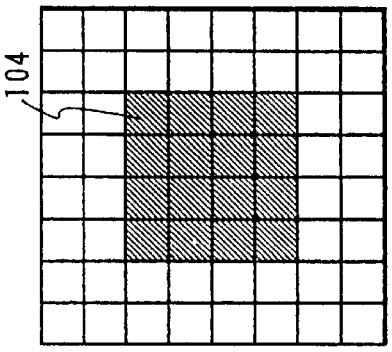
Figure 12F:
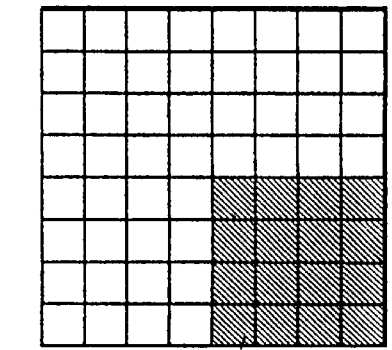

FIG. 9 is a flowchart which shows the detailed procedure of the compression detecting process sub-routine, which corresponds to the compression detecting process sub-routine shown in FIG. 5. In FIG. 9, the same processes as those appearing in FIG. 5 are provided with the same reference marks. The detailed description thereof will be omitted. The compression detecting process is to perform the retrieval of the attribute determination threshold values by detecting the compression hysteresis information in an image header.

In FIG. 9, at first in step S21, the compression hysteresis information is retrieved in the header section of an inputted image.

FIG. 10 is a view which shows one example of the file structure of an inputted image. In FIG. 10, the file of the inputted image comprises a header section 60, and a frame section 61 where the image data are stored. The header section 60 comprises a general information header 62 where general information on image attribute information is recorded, and compression hysteresis headers 63 to 65 where compression hystereses are stored. On the compression hysteresis headers 63 to 65, the type names and values on the quantization table are recorded per non-reversible compression process. In accordance with the example shown in FIG. 10, a record indicates that JPEG and MPEG compressions are processed once for each of them.

In the step S21, the compression header is inputted, and then, the compression hysteresis that presents the most radical deterioration is retrieved. As a method for implementing such retrieval, it is possible to apply the method for retrieving the greatest value of high frequencies in a quantization table, among some others.

Subsequently, in step S12, the distribution rate is worked out from the quantization table. For this rate calculation, it is possible to arbitrarily use any rate such as frequency and amplitude rates described in the first embodiment.

In the step S13 that follows, the determination table is retrieved by use of the distribution rate worked out in the step S12. Then, the process terminates after the threshold values are set up in the attribute determination unit 22b. Here, it is possible to use the same structure as that of the table data of the determination table 24 (see FIG. 2) of the first embodiment for the data table of this determination table unit 24, although the values of the frequency rate and amplitude rate are different.

As described above, in accordance with the second embodiment, the result of extraction is obtainable exactly the same as the first embodiment. Also, it is possible to know the deterioration characteristics of the previous compression exactly. Therefore, the threshold values can be set up more accurately, and to implement the enhancement of the area extraction rate accordingly.

Here, the present invention is not necessarily limited to the second embodiment. It is widely applicable. For example, the structure of the image header 60 is formed arbitrarily if only it can specify the degrees of image deterioration. Also, when an image compression is executed, it may be possible to calculate the distribution rate and record it on a compression hysteresis header.

Also, the present invention is applicable to a system comprising a plurality of equipment or to an apparatus comprising only a single equipment. Further, the invention is of course applicable in a case where it is executable by the provision of a system or a program. In such a case, a program provided by a software for the implementation of the present invention, which is stored in a storage medium, is read out to the system or an apparatus, thus enabling such system or apparatus to benefit from the invention.

As described above, in accordance with the first and second embodiments of the present invention, it is possible to detect the image area having a desired attribute depending on whether or not any non-reversible compression process has been given to an inputted image data. Therefore, the invention demonstrates such effect that an image having a desired attribute can be cut off with a high extraction rate irrespective of whether or not the inputted image has compression hysteresis.

What is claimed is:

1. An image processing apparatus, comprising:
    transform means for transforming an inputted image, thereby generating a transformed image;
    determination means for determining whether or not the transformed image has been compressed by any non-reversible compression process before said transformation;
    change means for changing a threshold value in accordance with the result of said determination; and
    detection means for detecting an image area having a desired attribute by executing a comparison operation between characteristics of the transformed image and said threshold value changed by said change means.

2. An image processing apparatus according to claim 1, wherein said transform means executes an orthogonal transformation as the transformation of the inputted image, and said detection means executes a comparison operation for transformation coefficients created by said transformation.

3. An image processing apparatus according to claim 2, wherein said orthogonal transformation is discrete cosine transformation.

4. An image processing apparatus according to claim 2, wherein said orthogonal transformation is Fourier transformation.

5. An image processing apparatus according to claim 2, wherein said orthogonal transformation is Hadamard transformation.

6. An image processing apparatus according to claim 1, wherein said image area having a desired attribute is an area formed by characters.

7. An image processing apparatus according to claim 1, wherein said change means changes said threshold value from among a plurality of threshold values set up in advance.

8. An image processing apparatus according to claim 2, wherein said determination means determines whether or not the transformed image has been compressed by any non-reversible compression process by detecting the concentration of said created transformation coefficients on a given frequency.

9. An image processing apparatus according to claim 2, wherein said determination means calculates the distribution rate of said created transformation coefficients, and compares said calculated distribution rate with the threshold values set up in advance in order to determine whether or not the transformed image has been compressed by any non-reversible compression process.

10. An image processing apparatus according to claim 1, wherein said determination means determines whether or not the transformed image has been compressed by any nonreversible compression process at each of a plurality of compression levels, and said change means changes the threshold value in accordance with the compression level.

11. An image processing apparatus according to claim 2, wherein said determination means determines whether or not the transformed image has been compressed by any non-reversible compression process by use of added information on the transformed image.

12. An image processing apparatus according to claim 11, wherein said added information is information on the compression hysteresis of the image header of the transformed image.

13. An image processing method comprising the steps of:
transforming an inputted image data to generate a transformed image;
determining whether or not the transformed image has been compressed by any non-reversible compression process before said transformation;
changing a threshold value in accordance with the result of said determining; and
detecting an image area having a desired attribute by executing a comparison operation between characteristics of the transformed image and said threshold value in said changing step.

14. An image processing method according to claim 13, wherein an orthogonal transformation is executed as said transformation in said transforming step, and said comparison operation is executed for transformation coefficients created by said transformation in said detecting step.

15. An image processing method according to claim 14, wherein said orthogonal transformation is discrete cosine transformation.

16. An image processing method according to claim 14, wherein said orthogonal transformation is Fourier transformation.

17. An image processing method according to claim 14, wherein said orthogonal transformation is Hadamard transformation.

18. An image processing method according to claim 13, wherein said image area having a desired attribute is an area formed by characters.

19. An image processing method according to claim 13, wherein said threshold value is changed from among a plurality of said threshold values set up in advance, in said changing step.

20. An image processing method according to claim 14, wherein a determination is made in said determining step as to whether or not the transformed image has been compressed by any non-reversible compression process by detecting the concentration of said created transformation coefficients on a given frequency.

21. An image processing method according to claim 14, wherein the distribution rate of said created transformation coefficients is calculated, and said calculated distribution rate is compared with the threshold values set up in advance in order to determine whether or not the transformed image has been compressed by any non-reversible compression process in said determining step.

22. An image processing method according to claim 13, wherein a determination is made as to whether or not the transformed image has been compressed by any non-reversible compression process at each of a plurality of compression levels in said determining step, and the threshold value is changed in accordance with the compression level in said changing step.

23. An image processing method according to claim 13, wherein a determination is made as to whether or not the transformed image has been compressed by any non-reversible compression process by use of added information on the inputted image in said determining step.

24. An image processing method according to claim 23, wherein said added information is information on the compression hysteresis of the image header of the inputted image.

25. A storage medium to store a computer program for the implementation of an image processing method comprising the steps of:
transforming an inputted image data to generate a transformed image;
determining whether or not the transformed image has been compressed by any non-reversible compression process before said transformation;
changing a threshold value in accordance with the result of said determining; and
detecting an image area having a desired attribute by executing a comparison operation between characteristics of the transformed image and said threshold value in said changing step.

* * * * *

UNITED STATES PATENT AND TRADEMARK OFFICE
CERTIFICATE OF CORRECTION

PATENT NO. : 6,249,609 B1
DATED : June 19, 2001
INVENTOR(S) : Shinichi Sunakawa et al.

It is certified that error appears in the above-identified patent and that said Letters Patent is hereby corrected as shown below:

Column 7,
Line 3, "accordance" should read -- accordance with --.

Column 11,
Line 36, "determining;" should read -- determining step; --.

Column 12,
Line 48, "determining;" should read -- determining step; --.

Signed and Sealed this

Twenty-sixth Day of February, 2002

Attest:

JAMES E. ROGAN
*Attesting Officer*     *Director of the United States Patent and Trademark Office*